Figure 1:
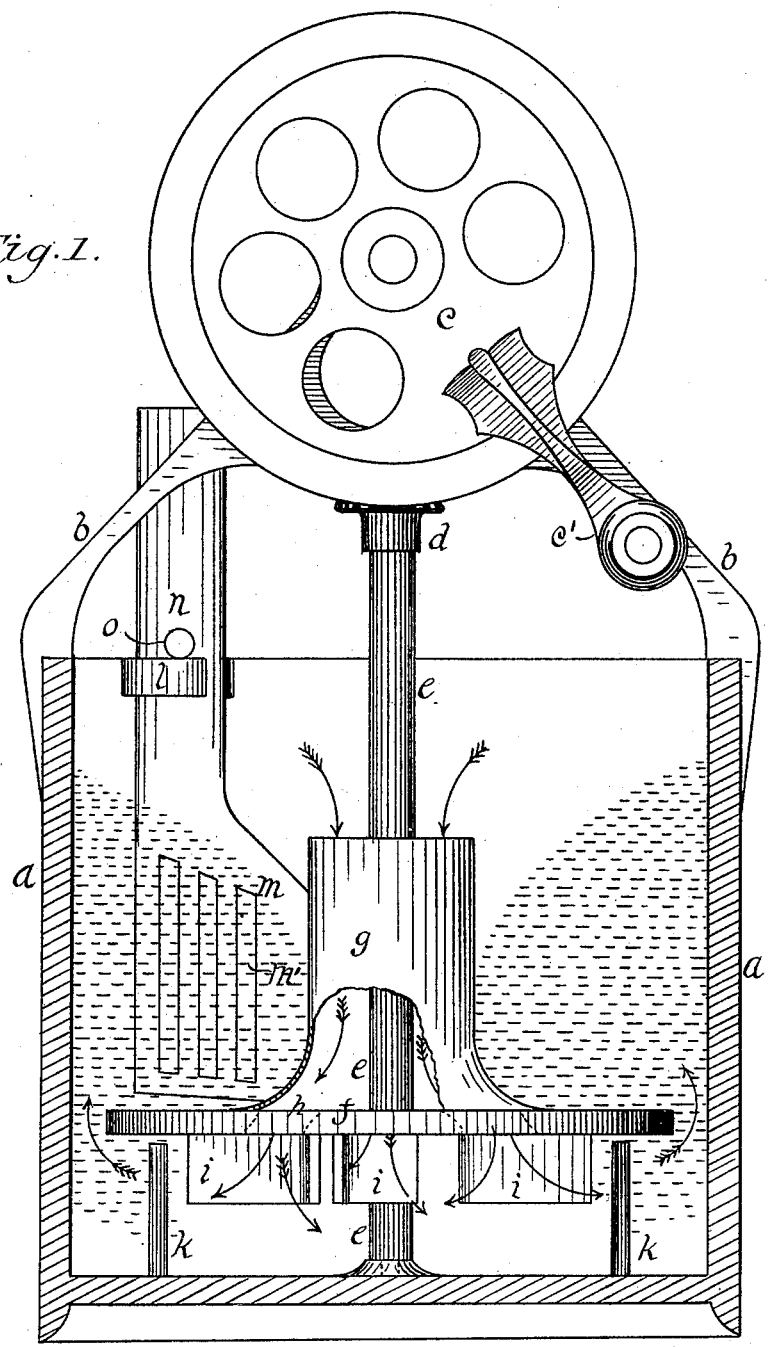

(No Model.) 2 Sheets—Sheet 2.

S. FRIEND.
CHURN.

No. 391,787. Patented Oct. 30, 1888.

ATTEST:
B. K. Dunfer.
J. K. Warren.

INVENTOR
Samuel Friend.
By L. P. Graham
his attorney.

United States Patent Office.

SAMUEL FRIEND, OF DECATUR, ILLINOIS, ASSIGNOR OF THREE-FOURTHS TO JOHN K. WARREN, BRADFORD K. DURFEE, AND DANIEL H. HEILMAN, ALL OF SAME PLACE.

CHURN.

SPECIFICATION forming part of Letters Patent No. 391,787, dated October 30, 1888.

Application filed May 3, 1888. Serial No. 272,624. (No model.)

*To all whom it may concern:*

Be it known that I, SAMUEL FRIEND, of the the city of Decatur, county of Macon, and State of Illinois, have invented certain new and useful Improvements in Churns, of which the following is a specification.

My invention consists in the means for making butter hereinafter set forth and claimed.

My invention operates by forcing air into or through the milk or cream while the same is being more or less agitated, and comprises the mechanism set forth in the drawings, in which—

Figure 2:
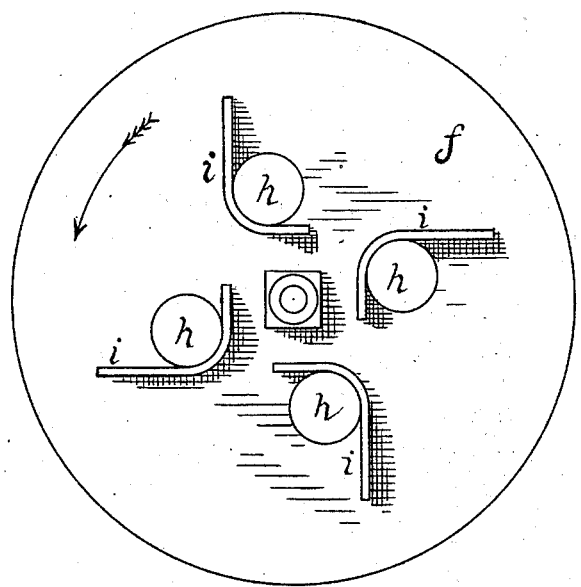

Figure 1 represents a cream-receptacle in central vertical section with my device in operative connection therewith, and Fig. 2 represents the bottom of the disk and the fans or beaters that create the air-current.

The cream-receptacle is indicated by reference-letter *a*. *b* represents a bracket that provides bearings for shaft *e* and the shaft of drive-wheel *c*. Drive-wheel *c* has a crank-arm, *c'*, and is geared to mesh with the pinion *d* on shaft *e*. Near the lower end of shaft *e* is disk *f*, perforated at *h h h h*. (See Fig. 2.) The disk is smaller in diameter than the adjacent internal diameter of the receptacle, and is provided on its lower surface with fans or beaters *i i i i*. Fitting close to the top of the disk and encircling the shaft is air-duct *g*. Projecting upward from the bottom of the receptacle, outside the path of the fans, are pins *k* in any desired number.

In Fig. 1, *l* represents a clamp-support for butter-gatherer *m*. The gatherer is preferably slotted at *m'*, and it has a handle, *n*, provided with a projection, *o*, that rests on the clamp-support and sustains the gatherer.

In operation the shaft is rapidly rotated in the direction indicated by the arrow in Fig. 2. The fans beat the cream against the pins and also establish a strong current of air in the direction indicated by the arrows in Fig. 1. The air-current is effective in breaking the butter-sacs, and it also tends to force the cream above the disk, where the butter may be readily gathered. The gatherer, which is a desirable but not indispensable concomitant of my device, may be manipulated to swing more or less near the air-duct, according as greater or less resistance to the rotative force of the mass of butter is required to form a ball.

I claim as new and desire to secure by Letters Patent—

1. In a churn, the combination, with the milk or cream receptacle, of vertical shaft *e*, carrying the horizontal perforated disk *f*, provided on its upper side with an open tubular air-duct, *g*, which surrounds said shaft and perforations, and on its under side with fans or beaters *i*, partially surrounding said perforations, as set forth.

2. In a churn, the combination, with the milk or cream receptacle having pins *k*, of vertical shaft *e*, carrying the horizontal perforated disk *f*, provided on its upper side with an open tubular air-duct, *g*, which surrounds said shaft and perforations, and on its under side with beaters *i*, as set forth.

3. In a churn, the combination, with the milk or cream receptacle having pins *k* and supporting pivotally a gathering-plate, *m*, of shaft *e*, provided with horizontal perforated disk *f*, carrying upon its upper side the tubular air-duct *g* and on its lower side the beaters *i*, as set forth.

In testimony whereof I sign my name in the presence of two subscribing witnesses.

SAMUEL FRIEND.

Attest:
B. K. DURFEE,
J. K. WARREN.